United States Patent [19]

Naito et al.

[11] 3,939,237
[45] Feb. 17, 1976

[54] METHOD OF MAKING A FLUID TRANSMITTING POROUS TUBE OR SHEET

[75] Inventors: Hirokuni Naito, Hino; Isao Yoshimura, Fujisawa; Hisao Tashiro, Kawasaki, all of Japan

[73] Assignee: Asahi Dow, Ltd., Tokyo, Japan

[22] Filed: Apr. 22, 1974

[21] Appl. No.: 462,592

Related U.S. Application Data

[62] Division of Ser. No. 190,548, Nov. 19, 1971.

[52] U.S. Cl. .......... 264/54; 260/2.5 E; 260/2.5 HA; 264/176 R; 264/209; 264/DIG. 5; 264/DIG. 13
[51] Int. Cl.² .................. B29D 27/00; B29D 23/04
[58] Field of Search ........... 264/51, 53, 54, DIG. 5, 264/DIG. 8, DIG. 13, 176 R, 209; 260/2.5 E, 2.5 HA, 4 R

[56] References Cited

UNITED STATES PATENTS

| | | | |
|---|---|---|---|
| 3,207,711 | 9/1965 | Spenadel et al. | 260/2.5 E |
| 3,240,727 | 3/1966 | Scalari et al. | 260/2.5 HA |
| 3,250,730 | 5/1966 | Palmer | 260/2.5 E |
| 3,358,695 | 12/1967 | Blakey et al. | 264/DIG. 5 |
| 3,488,746 | 1/1970 | Gilbert | 264/53 |
| 3,491,032 | 1/1970 | Skochdopole et al. | 260/2.5 HA |
| 3,539,666 | 10/1970 | Schirmer | 264/DIG. 8 |
| 3,562,369 | 2/1971 | Chopra et al. | 264/DIG. 8 |
| 3,576,931 | 4/1971 | Chopra et al. | 264/DIG. 8 |
| 3,610,509 | 10/1971 | Winstead | 264/DIG. 5 |
| 3,657,165 | 4/1972 | Kawai et al. | 260/4 R X |
| 3,755,208 | 8/1973 | Ehrenfreund | 264/DIG. 5 |
| 3,810,964 | 5/1974 | Ehrenfreund | 264/DIG. 5 |

FOREIGN PATENTS OR APPLICATIONS

| | | | |
|---|---|---|---|
| 1,157,299 | 7/1969 | United Kingdom | 264/DIG. 8 |
| 1,192,132 | 5/1970 | United Kingdom | 264/DIG. 8 |
| 44-17593 | 8/1969 | Japan | 264/DIG. 5 |
| 44-18254 | 5/1971 | Japan | 264/DIG. 5 |
| 1,022,051 | 3/1966 | United Kingdom | 260/2.5 E |
| 1,022,052 | 3/1966 | United Kingdom | 260/2.5 E |
| 1,271,274 | 4/1972 | United Kingdom | 264/DIG. 13 |
| 2,061,121 | 6/1971 | Germany | 260/2.5 E |

OTHER PUBLICATIONS

Bernhardt, Ernest C., Edt. "Processing of Thermoplastic Material," New York, Reinhold, 1959, pp. 214–217, SPE Plastics Engineering Series).

McKelvey, James M., "Polymer Processing," New York, John Wiley and Sons, 1962, pp. 289–295.

Dubois, J. H. and Pribble, W. I., Edt. "Plastics Mold Engineering," revised edition, New York, Reinhold, 1965, pp. 505–512 (SPE Polymer Technology Series).

Harding, R. H., "Morphologies of Cellular Materials," In Resinography of Cellular Plastics, A Symposium presented at the 69th Annular Meeting of the ASTM, Atlantic City, N. J., June 26–July 1, 1966. ASTM Special Technical Publication No. 414, Philadelphia, Pa., ASTM, 1967, pp. 3–9.

Ingram, A. R.; R. R. Cobb; and L. C. Couchot, "The Microscopical Examination of Molded and Extruded Polystyrene Foams," In Resinography of Cellular Plastics, A Symposium presented at the 69th Annual Meeting of the ASTM Atlantic City, N. J., June 26–July 1, 1966, ASTM Special Technical Publication No. 414, Philadelphia, Pa., ASTM, 1967, pp. 53–55; 59–64.

Benning, Calvin J., "Plastic Foams, the Physics and Chemistry of Product Performance and Process Technology," Vol. II, Structure Properties and Applications, New York, Wiley–Interscience, 1969, pp. 11–31; 58–59; 81–93.

*Primary Examiner*—Philip Anderson
*Attorney, Agent, or Firm*—Burgess Ryan and Wayne

[57] ABSTRACT

A novel tube or sheet-shaped fluid transmitting porous material containing as a substrate, a polyolefin. Such porous material can be readily produced by subjecting a mixture of a polyolefin, a specific secondary polymer and a decomposition type blowing agent to extrusion moulding. The present porous material has certain unique features in its structure characterized in that there are recurring communications between cell wall openings forming a passage through which a fluid can pass. This porous material has excellent gas and liquid transmitting properties as well as an excellent filtering property and, in addition, is superior in resistance to chemicals and also has mechanical strength. Therefore, the porous material according to this invention is widely applicable in agriculture and industry as well as in the fields of synthetic leather etc.

8 Claims, 6 Drawing Figures

METHOD OF MAKING A FLUID TRANSMITTING POROUS TUBE OR SHEET

This is a division of application Ser. No. 190,548, filed Oct. 19, 1971.

This invention relates to a method of making a porous material, and more particularly to a tube or sheet-shaped fluid transmitting porous material containing as a substrate a polyolefin. It has been disclosed, for example in U.S. Pat. No. 3,310,505, a method for producing a fluid transmitting polyolefin porous material. According to this method, polyethylene and polymethyl methacrylate are blended and then extruded, and finally, the resulting plastic material is immersed in a selective solvent to leach out of the plastic material, i.e. polymethyl methacrylate, to obtain a polyethylene porous material. In such a method, however, a large amount of a compoment, to be leached by a selective solvent is required to obtain the desired high porosity material. Therefore, such a method is uneconomical and unproductive. Besides the above-mentioned prior art method, there are other methods for producing a polyolefin porous material; for example, by mechanical perforation, by perforation through sintering the powdered materials, by perforation through binding the fibrous materials, by perforation employing a radiation, etc. However, any of these known methods is not advantageous from the economic point of view and, in addition, the obtained porous materials have poor fluid transmitting property.

The present invention consists in a method of making a tube or sheet-shaped fluid transmitting porous material which comprises a foam of a composition of a polyolefin and a secondary polymer selected from the group consisting of an etylene-vinyl ester copolymer, a copolymer of ehtylene with an unsaturated carboxylic acid ester, a rubber, a thermoplastic elastomer and mixtures thereof.

The present invention further embraces a method of making a tube or sheet-shaped fluid transmitting porous material. This method comprises mixing a polyolefin, a secondary polymer and a decomposition type blowing agent, said secondary polymer being a member selected from the group consisting of an ethylene-vinyl ester copolymer, a copolymer of ethylene with an unsaturated carboxylic acid ester, a rubber, a thermoplastic elastomer and mixtures thereof, and subjecting the resulting foaming polymer mixture to extrusion moulding.

Accordingly, it is an object of the present invention to provide a novel method of making fluid transmitting porous material containing as a substrate a polyolefin.

It is another object of the present invention to provide a method of making a tube or sheet-shaped fluid transmitting porous material which possesses superior properties and can be readily handled.

It is a further object of the present invention to provide a method of making a fluid transmitting porous material of the character described, which can be easily and economically effected.

It is a still further object of the present invention to provide a method of making a fluid transmitting porous material which is useful as a filter medium.

It is a still further object of the present invention to provide a method of making a fluid transmitting porous material which is useful as a leather material.

It is a still further object of the present invention to provide a method of making a fluid transmitting porous material which is widely useful for various purposes requiring air and liquid transmitting properties.

The foregoing and other objects, features and advantages of this invention will be readily apparent to those skilled in the art from the following description and the appended claims.

The term "polyolefin" used herein is intended to include olefin homopolymers such as a low density polyethylene, a high density polyethylene, polypropylene, polybutene, polypentene and the like, and olefin copolymers such as a propylene-ethylene copolymer, a propylene-butene copolymer, a propylene-hexene copolymer and the like. They may be employed alone or in admixture. In this connection, it is noted that an ethylene-vinyl acetate copolymer of which the vinyl acetate content is less than 10% by weight based on the copolymer and copolymers of ethylene with an olefinically unsaturated carboxylic acid ester such as ethyl acrylate, methyl methacrylate and the like, of which the ester content is less than 10% by weight based on the copolymer, can be regarded and handled as a polyethylene since they are substantially the same in property with polyethylene.

The term "ethylene-vinyl ester copolymer" used herein is intended to include those of which the melt index is 2.0 or more and the vinyl ester content is 10% by weight or more based on the copolymer.

The term "copolymer of ethylene with an unsaturated carboxylic acid ester" used herein is intended to include copolymers of ethylene with various classes of unsaturated carboxylic acid esters including ethyl acrylate, methyl methacrylate and the like, i.e. an ethylene-ethyl acrylate copolymer, an ethylene-methyl methacrylate copolymer and the like, of which the ester content is 10% by weight or more based on the copolymer. In the above definitions, the melt index is measured by the method according to ASTM-D-1238 and the ester content is obtained by the infrared spectro photometric analysis in which the degree of the absorption of a C=O band having a wave number of 1,740 cm$^{-1}$ or 3,480 cm$^{-1}$ is measured and then the ester content calibrating diagram which has previously been prepared is utilized to determine, for example, a vinyl acetate, ethyl acrylate or methyl methacrylate content of the copolymer.

The term "rubber" used herein is intended to include a natural rubber, a butadiene rubber, a styrene-butadiene rubber (random copolymer obtained by solution polymerization), a styrene-butadiene rubber (random copolymer obtained by emulsion polymerization), a butadiene-acrylonitrile rubber, an isoprene-butadiene rubber, a polyisoprene rubber, an isobutylene-isoprene rubber and the like.

The term "thermoplastic elastomer" used herein is intended to include elastomers which have, in an unvulcanized state, an elasticity like rubber and a plasticity like thermoplastic resins. Representative examples of them are block copolymers represented by the following simplified structural formula $(B - S)_{n+1}$, $(B - S)_{n+1}-B$ or $S - (B - S)_n$ wherein $n$ is an integer of 1 to 10; B represents substantially a polymer block of a conjugated diolefin type monomer, e.g. a polymer block of a conjugated diolefin such as 1,3-butadiene, isoprene, 1,3-pentadiene, 2,3-dimethylbutadiene or the like, a polymer block of a mixture of conjugated diolefins or a polymer block composed of a mixture comprising a conjugated diolefin and a monovinyl type monomer and having properties as a rubber elastomer; and S represents a polymer block of a monovinyl type monomer such as a monovinyl-substituted aromatic hydrocarbon, e.g. styrene and methylstyrene, or the like. Such block copolymers comprising a polymer block B of a conjugated diolefin type monomer and another polymer block S of a monovinyl type monomer generally have a weight average molecular weight of 10,000 – 500,000, and a monovinyl-substituted monomer content of 10 – 70 % by weight.

Particularly preferred examples of the secondary polymers to be admixed with the polyolefin include an ethylene-vinyl acetate copolymer, a natural rubber, a butadiene rubber, a polyisoprene rubber, a random copolymer type styrene-butadiene rubber obtained by solution polymerization, a polyisoprene rubber, a styrene-butadiene block copolymer, a styrene-isoprene block copolymer and the like. The advantage of these polymers is in that the final product can be imparted a high fluid transmitting property and, moreover, the extrusion moulding operation can be easily effected when mixed with the polyolefin.

The term "decomposition type blowing agent" used herein is intended to include those capable of evolving a gas, due to decomposition, on heating; for example, azo-type compounds such as azodicarbonamide (about 260 ml./g.), barium azodicarboxylate (about 177ml./g.), diazoaminobenzene (about 115 ml./g.) and the like, sulfohydrazide-type compounds such as 4,4'-hydroxy-bisbenzenesulfonylhydrazide (about 115ml./g.), p-toluenesulfonylhydrazide (about 110ml./g.) and the like, and nitroso-type compounds such as dinitrosopentamethylenetetramine (about 270ml./g.) and the like. The figure in the parentheses following each of the above specific compounds shows the approximate value of the volume of gas (in the normal state) obtained by the thermal decomposition of 1g. of the compound.

Features of the present invention will be further described with reference to the accompanying drawings, in which.

Figure 1:
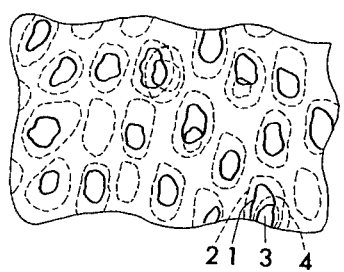
FIG. 1 is an illustrative plan view of a porous material of the present invention.
Figure 2:
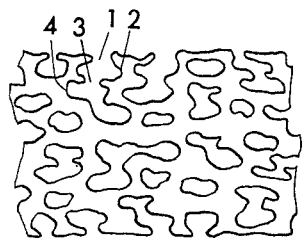
FIG. 2 is an illustrative cross section of a porous material of the present invention, showing the internal structure.

Referring now to FIGS. 1 and 2, features of the structure of a porous material of this invention will be described. Numeral 1 designates an opening formed in a cell 2. A cell 4 present in an inner layer of the cell 2 has an opening 3. As clearly seen in FIG. 1, the openings are not entirely substituted for the overall walls of cells but are present leaving a wall area. The area which the opening occupies is about 30 – 80% per area of cell profile shown by broken line in plan view of FIG. 1.

These openings have each a smooth circumference and a substantially circular shape, thus occupying a definite space. By recurrence of the communication between opening, cell and opening, an opening on one surface of the porous material communicates with an opening on the other surface of the porous material thereby to form a passage through which a fluid can pass. This can be clearly seen from FIG. 2 in which like numerals show like portions in FIG. 1. As seen from FIG. 2, there are substantially no passages running in a straight line along the line of thickness, and there are formed complicated winding or meandering passages.

Figure 3:
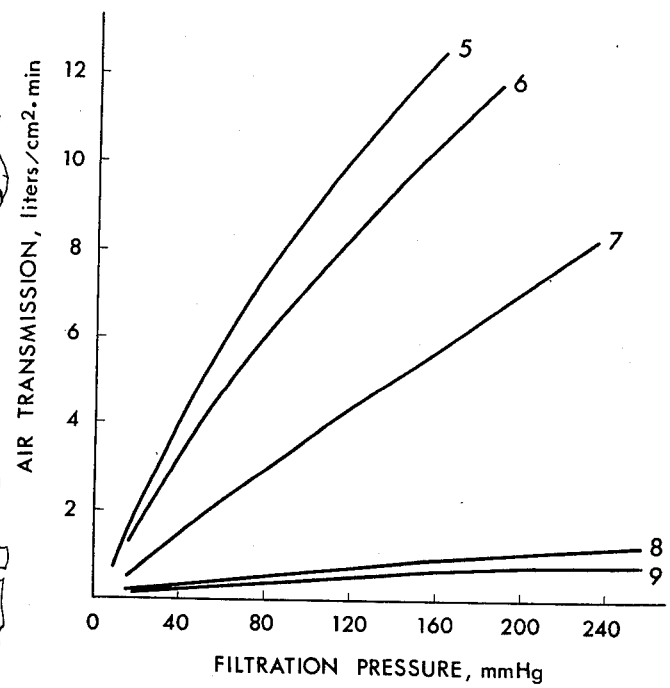
FIG. 3 is a graph of air transmission against filtration pressure of porous materials according to the present invention, shown in comparison with those of conventional porous materials.

FIG. 3 shows the relation between the air transmission and filtration pressure of the porous materials obtained in examples of this invention (mentioned later), compared to those of commercially available porous materials. In FIG. 3, the ordinate represents the air transmission (liters/$cm^2 \cdot min$) obtained dividing the transmitted air volume measured per 1 minute at the ordinary temperature by the filtration area ($cm^2$) of the specimen; the abscissa represents the filtration pressure (mmHg). The curves shown in FIG. 3 may be identified by the following Table.

| No. of Curve | Specimen | Thickness, mm. |
|---|---|---|
| 5 | Product from Formulation A in Example 2 | 0.45 |
| 6 | Commercially available filter paper | 0.200 |
| 7 | Product from Formulation C in Example 2 | 0.45 |
| 8 | Product from Formulation D in Example 2 | 0.45 |
| 9 | Commercially available polyurethane leather | 0.50 |

As is apparent from FIG. 3, the porous materials of the present invention have a fluid transmitting property widely ranging from that of the commercially available air transmitting leather to that of the commercially available filter paper. The porous materials of the present invention generally have an average cell diameter of 0.02 – 0.5 mm. and an expansion of 1.2 – 10 (times). In this connection it is noted that the average cell diameter and the expansion suitable for the use as a leather or a filter are in the range of 0.03 – 0.4mm. and in the range of 1.3 –5, respectively. Whilst the air transmitting property of the present porous material would decrease at an average cell diameter of below 0.2mm. and an expansion of below 1.2, the size of cell opening would be too large at an average cell diameter of above 0.5mm. and an expansion of above 10, leading to uneven distribution of opening sizes as well as decrease in strength and promoted formation of straight running passages.

The average cell size or diameter of a porous material is determined as follows. The lens of an optical microscope is focused against the cells present on the surface of the porous material. Then, with the transmission light and about 100 – 300 magnifications, the actual measurement is done utilizing a graduated lens or the photograph is taken. The longest diameter cell and the shortest diameter cell on the surface of the porous material are measured and the arithmetic mean of the thus obtained two values is defined as an average cell diameter or average cell size.

The expansion of a porous material is determined as follows. The expansion is represented by the formula $$\frac{\text{Volume of porous material}}{\text{Volume of solid components}}$$

The volume of porous material is obtained by measuring the width, length and thickness of a porous material; the volume of solid components is obtained by dividing the weight of the porous material by the density of the solid components. The density of the solid components is measured as follows: the porous material is melted and compressed to pressure-destroy the spaces in the porous material. The thus obtained specimen is subjected to measurement of density, in accordance with ASTM-D1505-68.

Porous materials of the present invention have a tubular or sheet shape. This is intended to mean the following. In case the porous material of this invention is, in cross section, defined substantially by inner and outer circumferences, it is tube-shaped; in case the porous material of this invention is, in cross section, defined substantially by a thickness and a width, it is sheet-shaped. The thickness of the porous material of this invention is generally in the range of 0.05 - 10mm., preferably 0.1 - 5mm, more preferably 0.15 - 3mm. This is so because while the present porous material with a thickness of below 0.05 mm. is poor in strength and tends to form a straightly running passage, the porous material with a thickness of above 10mm. has almost no air transmitting property. The porous material according to the present invention is excellent in strength, particularly in tear strength. Such excellent strength is due to the specific composition comprising a polyolefin and, in addition thereto, a secondary polymer having good compatibility with the polyolefin, such as a ethylene-vinyl ester copolymer, a copolymer of ethylene with an unsaturated carboxylic acid ester, a rubber or a thermoplastic elastomer.

The present porous materials can, according to this invention, be produced by a method which comprises mixing a polyolefin, a secondary polymer and a decomposition type blowing agent, said secondary polymer being a member selected from the group consisting of an ethylene-vinyl acetate copolymer, a copolymer of ethylene with an unsaturted carboxylic acid ester, a rubber, a thermoplastic elastomer and mixtures thereof, and subjecting the resulting foaming polymer mixture to extrusion moulding.

In mixing, the amount of the secondary polymer to be mixed with the polyolefin varies widely in the range of 5 - 95% by weight, preferably in the range of 10 - 50% by weight based on the weight of the mixture. This can be clearly seen from FIG. 5 which shows the relation between the air transmission and the amount of an ethylene-vinyl acetate copolymer blended as the secondary polymer, and from Examples in which the other secondary polymers are employed. Stated illustratively, the effective air transmitting properties can not be obtained unless the secondary polymer is employed in an amount of at least 5% by weight based on the mixture. As the amount of the secondary polymer blended is increased, the air transmission increases. Then, the air transmission reaches the plateau region at 40 – 60% by weight of the secondary polymer blended. In this connection, it is noted that the secondary polymer may be employed in an amount of up to 95% by weight according to desired mechanical properties of the product. The curves shown in FIG. 5 may be identified by the following Table.

| No. of Curve | Kind of EVA blended |
|---|---|
| 12 | EVA [melt index: 150, vinyl acetate content (hereinafter referred to VAC): 30 wt%] |
| 13 | EVA (melt index: 6, VAC: 30wt%) |
| 14 | EVA (melt index: 2, VAC: 25 wt%) |
| 15 | EVA (melt index: 15, VAC: 12 wt%) |
| 16 | EVA (melt index 2, VAC: 12 wt%) |

Thus, it is considered that the secondary polymer to be mixed with a polyolefin substrate should assist the formation of openings in cells to be promoted.

As shown, as a comparative example, in Example 1, the plastic foam produced by extrusion-mouldiing a mixture of a low density polyethylene and a decomposition type blowing agent under the conditions capable of making a uniformly foamed material has most of its cells closed and no air transmitting property. In this case, when the extrusion moulding is effected under certain foaming conditions, for example at high temperature, the closed cells occasionally collapse locally and joined together to form voids and give an uneven and coarse cellular structure in which there are partly formed apparent open cells. However, it should be noted that such a product is utterly different from the present fluid transmitting porous material having various excellent properties.

Figure 5:
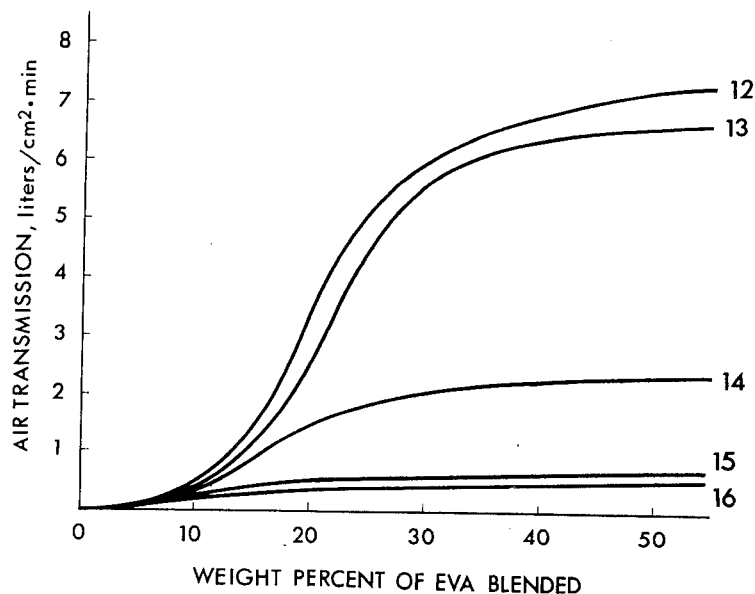
FIG. 5 is a graph of air transmission against amount of EVA blended as the secondary polymer according to the present invention.
Figure 6:
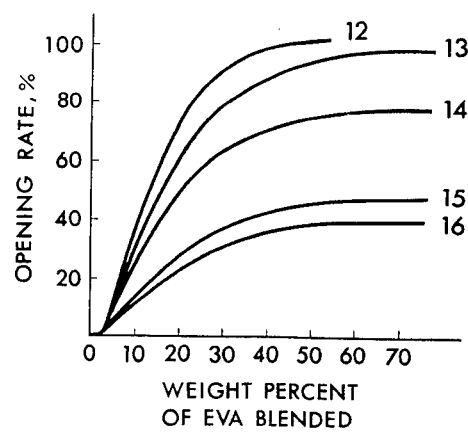
FIG. 6 is a graph of opening rate against amount of EVA blended as the secondary polymer according to the present invention.

The opening rate namely, the proportion of the total volume of open cells communicating with the outside to the volume of the porous material, is varied depending on the amount of the secondary polymer blended. This can be clearly seen from FIG. 6 which shows the relation between the opening rate and the amount of an ethylene-vinyl acetate copolymer blended as the secondary polymer. In FIG. 6, the curve bearing the same number as in FIG. 5 shows the characteristics of the same kind of EVA as in FIG. 5. According to the present invention, the maximum of opening rate can be adjusted to a degree of about 100%. The effective fluid transmitting property of the present porous material can be attained at an opening rate of about 10% or more.

Figure 4:
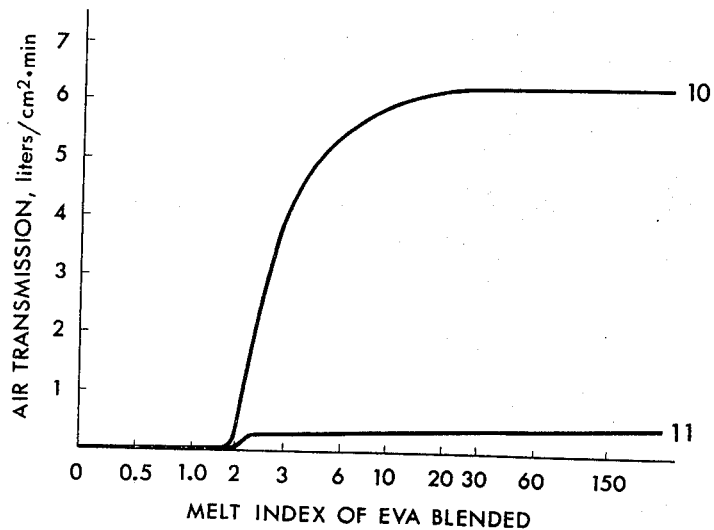
FIG. 4 is a graph of air transmission against melt index of ethylene-vinyl acetate copolymers (hereinafter referred to simply as "EVA") blended as a secondary polymer according to the present invention.

As described before, according to the present invention, in case an ethylene-vinyl acetate copolymer is employed as the secondary polymer, the ethylene-vinyl acetate copolymer should have a vinyl acetate content of 10% or more and a melt index of 2.0 or more to obtain a porous product having an effectively high fluid transmitting property. This is substantiated by FIGS. 4 and 5. FIG. 4 shows the relation between the air transmission and the melt index of an ethylene-vinyl acetate copolymer blended as the secondary polymer. The curves shown in FIG. 4 may be identified by the following Table.

| No. of Curve | Kind of EVA blended |
|---|---|
| 10 | EVA having a VAC of 25 – 30 wt% |
| 11 | EVA having a VAC of 12 wt% |

As shown, as a comparative example, in Example 1, the incorporation of EVA having a sufficient melt index of 20 but a low vinyl acetate content of 5 wt% results in a product having almost no air transmitting property. The incorporation of EVA having a small melt index of 0.5 and a low vinyl acetate content of 6 wt% also results in a product having no air transmitting property. By contrast, the present porous materials obtained through incorporation of an EVA having both a melt index and a vinyl acetate content sufficient for the above-mentioned requirements, namely at least 2.0 and at least 10.0, respectively, has an excellent air transmitting property.

The decomposition type blowing agent which may be employed is suitably selected from the afore-mentioned compounds, depending upon the the property of polyolefin used. The decomposition type blowing agents may be employed, alone or in mixture, in an amount of 0.1 – 5 parts, preferably 0.3 – 3.0 parts, more preferably 0.4 – 2.0 parts by weight, in terms of parts of azodicarbonamide, per 100 parts by weight of a mixture of the polyolefin and the secondary polymer. When the other blowing agents than azodicarbonamide, which can evolve only a smaller amount of gas, are employed, the amounts of agents are suitably selected considering the volume of evolved gas compared with the gas volume from azodicarbonamide. The use of the blowing agent of less than 0.1 part by weight, in terms of parts of azodicarbonamide, per 100 parts by weight of the mixture of the polyolefin and the secondary polymer does not cause sufficient opening of cells, resulting in poor fluid transmitting property. The use of the blowing agent of more than 3 parts by weight based on the above-mentioned standard leads also to poor opening of cells. The use of the blowing agent of more than 5 parts by weight based on the above-mentioned standard causes collapse of the cells and then forms voids, leading to uneven and coarse porosity and extremely poor strength of the product, and also tends to render the extrusion moulding unstable. Examples of the auxiliary blowing agents employed together with the above-mentioned decomposition type blowing agents include stearates such as zinc stearate and calcium stearate, zinc oxide and the like. These auxiliary blowing agents are useful for making the foaming uniform. Nucleating agents such as finely powdered talc, silica and the like may also be advantageously employed together with the decomposition type blowing agents in order to make the foam uniform.

In carrying out the present invention, a polyolefin is blended with a secondary polymer selected according to the use of the product and a decomposition type blowing agent, and, if desired, an auxiliary blowing agent, a nucleating agent, a coloring agent such as pigment, an inorganic fillers, an aging inhibiting agent and other suitable additives. The resulting mixture is subjected to extrusion moulding.

In carrying out the method of this invention, as described before, mixing of a polyolefin and a decomposition type blowing agent and extrusion moulding of the resulting mixture are requisites. The extrusion moulding is effected employing a tube or sheet making die, an extruder and appurtenances which are usually employed for extrusion moulding of thermoplastic resins. The "extrusion temperature" used herein means a temperature at which the decomposition type blowing agent is decomposed before the melted composition is extruded out of the extrusion system. The decomposition temperature of a certain kind of decomposition type blowing agent may be somewhat varied depending on the kind and the amount of the auxiliary blowing agent, nucleating agent or other additives employed together with the decomposition type blowing agent.

It is not desirable to employ too long a period of time during which the melted mixture retains in the extrusion system before the melted composition is extruded out of the extrusion system. In the method of this invention, it is preferable that the extrusion speed V represented by the following formula (I) is 7 cm/min. or more $$V = Q/W \quad (I)$$

wherein

Q represents an extrusion volume of the extruded porous material from which the contained space volume is subtracted ($cm^3$/min.), W represents a cross section area of the die slit ($cm^2$) and, V represents an extrusion speed calculated from Q and W (cm/min.).

In the above, the extrusion volume of the extruded porous material from which the contained space volume is subtracted (Q) is obtained by dividing the weight of the porous material extruded per minute by the density of the solid components of the porous material, and the cross section area (W) of the die slit is a cross section area of the die of the position at which the pressure applied in extruding the melted composition out of the extrusion system is substantially released. When the extrusion speed is less than 7 cm/min., the retention time of the melted composition in the extrusion system becomes too long. The long retention of the melted composition tends to cause the surface of the product to be coarse and, at the same time, tends to form voids in the product by joining relatively large cells, resulting in an undesirable structure of the porous material.

In extrusion moulding according to this invention, there is another preferable extrusion condition namely, the condition with regard to the relation between the die slit clearance and the thickness of the porous material product. The thickness of the porous material product is related to the expansion, and therefore, the above-mentioned relation between the die slit clearance and the thickness of the product can be expressed in terms of the relation between the die slit clearance and the thickness of the foaming polymer composition in the state before foaming. It is preferable that this relation meets the following formula $$0.15 < S/t_2 < 10 \quad (II)$$

more preferably, $$0.3 < S/t_2 < 5 \quad (III)$$

wherein $t_2 = t_1/\sqrt[3]{a}$, $1.2 < a < 10$,

S represents an average die slit clearance (mm.), $t_2$ represents an average thickness of the foaming polymer composition in the state before foaming (mm.), $t_1$ represents an average thickness of the porous material (mm.), and ($a$) represents an expansion based on the volume of the foaming polymer composition in the state before foaming (times).

In the above, the average die slit clearance (S) is expressed as a mean value of the measurements of the die slit clearance of the die slit position at which the pressure applied to the melted composition is released. The average thickness ($t_1$) of the porous material is expressed as a mean value of the measurements of the thickness of the porous material. The average thickness ($t_2$) of the foaming polymer composition is obtained by calculation from $t_1$. The expansion ($a$ based on the volume of the foaming polymer composition in the state before foaming is, as aforementioned, obtained by dividing the volume of the porous material by the volume of solid components of the porous material; the volume of the solid components is obtained by dividing the measured weight of the porous material by the density of the solid components; the method of measuring the density of the solid components is as set forth before. When the $S/t_2$ is less than 0.15, the melted composition extruded from the die slit tends to wave in over-all and as a result, the obtained porous material has a fluid transmitting property but not a smooth surface. When the $S/t_2$ is more than 10, the melted composition extruded from the die slit tends to be excessively drawn and occasionally subject to tearing off. The excessively drawn porous material result in the formation of large, elongated cells thereby forming voids in the porous material, and as a result, it becomes different in structure from the porous material of the present invention.

As described, the porous material according to the present invention has not only an excellent fluid transmitting property but also a uniform and fine-cell cellular structure having a relatively low expansion of 1.2 – 10 (times), rendering it tough. Whilst, for example, the polyolefin porous material produced by sintering the powdered polyolefin is broken by only one-time bending, the porous material of the present invention has such excellent strength or toughness that it is capable of withstanding, for example, 1000-time bendings at an angle of 180°. Moreover, it is to be noted that, since the polymers blended as the secondary polymer have a relatively good compatibility with the polyolefin employed as the substrate as different from polystyrene and the like which are poor in their compatibility, the present porous material is excellent in mechanical strength as well as resistance to low temperature and resistance to enviromental stress which would cause cracks. Accordingly, the present porous material has a wide variety of excellent properties. Furthermore, by varying the kind and the amount of the polyolefin as well as the secondary polymer, there can be obtained a product having a wide range of touch; namely, from hard touch to pliant touch like a deer skin.

Thus, a porous material according to the present invention has a wide variety of uses, such as gas and liquid filter materials, which are excellent, for example in chemicals resistance, as compared with a conventional filter cloth; a diaphragm for various purposes, for example as a mulching film in the agricultural field and as a bandage material in the medical field; dressing material; leather material; and so on.

The present invention is illustrated, by way of example only, with reference to the following examples.

Example 1

Into a mixture of a polyolefin indicated in the following Table I with an ethylene-vinyl acetate copolymer as a secondary polymer in various proportions were blended, per 100 parts by weight of the mixture 0.75 parts by weight of azodicarbonamide as a decomposition type blowing agent, 0.5 parts by weight of zinc stearate as an auxiliary blowing agent, 1.0 part by weight of calcium stearate and 0.5 parts by weight of finely-divided talc as a nucleating agent. The mixture was uniformly admixed by means of a blender. The comparative examples are also shown. In the Formulations E, I, J and K, there were not incorporated the specific ethylene-vinyl acetate copolymer serving as a secondary polymer of this invention.

Table I

| Polymer \ Formulation | A | B | C | D | E | F | G | H | I | J | K |
|---|---|---|---|---|---|---|---|---|---|---|---|
| ① Low density polyethylene | 70 | 70 | 60 | 60 | 100 | | | | | 60 | 70 |
| ② High density polyethylene | | | | | | 70 | | | | | |
| ③ Polypropylene | | | | | | | 50 | | | | |
| ④ Ethylene-vinyl acetate copolymer | | | | | | | | 70 | 100 | 40 | |
| ⑤ " | | | 40 | | | | | | | | |
| ⑥ " | | 30 | | | | | | | | | |
| ⑦ " | 30 | | | | | | | | | | |
| ⑧ " | | | | 40 | | | | | | | |
| ⑨ " | | | | | | | | | | | 30 |
| ⑩ " | | | | | | | | 50 | | | |
| ⑪ " | | | | | | 30 | | 30 | | | |

NOTE:
polymer No. 5,6,7,8,10 and 11 are the secondary polymers of this invention.

In the above Table, the proportions are given by weight parts. The properties of the polymers are shown below:

① Melt Index: 0.3, Density: 0.917g/cm³
② Melt Index: 2.0, Density: 0.97g/cm³
③ Melt Index: 3.0, Density: 0.90g/cm³
④ Melt Index: 0.5, Density: 0.927g/cm³, Vinyl Acetate Content: 6 wt %
⑤ Melt Index: 2.0, Density: 0.93g/cm³, Vinyl Acetate Content: 12 wt %
⑥ Melt Index: 2.0, Density: 0.95g/cm³, Vinyl Acetate Content: 25 wt %
⑦ Melt Index: 150, Density: 0.95g/cm³, Vinyl Acetate Content: 30 wt %
⑧ Melt Index: 15, Density: 0.95g/cm², Vinyl Acetate Content: 30 wt %
⑨ Melt Index: 20, Density: 0.925g/cm³, Vinyl Acetate Content: 5 wt %
⑩ Melt Index: 6, Density: 0.95g/cm³, Vinyl Acetate Content: 30 wt %
⑪ Melt Index: 15, Density: 0.95g/cm³, Vinyl Acetate Content: 30 wt %

Then, the resulting blend was extruded at an extrusion temperature of 130°C. to 200°C. and an extrusion speed of 300 cm./min. by means of a 45 mm.-diametered extruder provided with an annular die having a diameter of 75 mm. and a slit of 0.6 mm. The extrudate was inflated to a given volume through the supply of a given amount of air thereinto and cooled between the die and the nip roll to produce a tubular porous material. The thus obtained tubular porous material was uniformly foamed and had a thickness of about 0.45 mm. and a lay flat width of 350 mm. as well as the properties as shown in the following Table II. In this case, the aforementioned extrusion conditions were as follows:

$Q/W = 300$ (cm./min.)
$S/t_2 = 1.65 - 1.83$
$a = 1.9 - 2.6$ (times)

of 20 $\mu$ is filtered through them under a filter pressure of 70 mmHg., no turbidity is observed in the filtrate. The products obtained from these Formulations also have a smooth surface which is pliant to the touch.

Table II

| Formulation<br>Measured value | Properties | | | | | | | | | | |
|---|---|---|---|---|---|---|---|---|---|---|---|
| | A | B | C | D | E | F | G | H | I | J | K |
| Average cell[1] size (mm.) | 0.05 | 0.13 | 0.16 | 0.11 | 0.15 | 0.05 | 0.08 | 0.08 | 0.30 | 0.19 | 0.12 |
| Density[2] (g./cm$^3$) | 0.42 | 0.35 | 0.45 | 0.40 | 0.49 | 0.43 | 0.43 | 0.39 | 0.40 | 0.42 | 0.58 |
| Opening rate[3] (%) | 97 | 70 | 39 | 44 | 0 | 80 | 76 | 84 | 7 | 3 | 2 |
| Air transmission[4] (liters/cm$^2$,min.) | 5.9 | 2.0 | 0.4 | 0.5 | 0 | 2.1 | 2.3 | 3.2 | 0 | 0 | 0 |
| Tear strength[5] (kg./cm.) | 10 | 12 | 14 | 11 | 16 | 22 | 19 | 13 | — | — | — |
| Tensile strength[6] (kg./cm$^2$) | 31 | 29 | 43 | 37 | 37 | 70 | 72 | 35 | — | — | — |

[1] Average cell size means an average cell diameter in the surface of a porous material and, if elliptic, shows an average value of a long diameter and a short one.
[2] Density is determined from the volume obtained by the measured length, width and thickness of a specimen and from the measured weight thereof.
[3] Opening rate is determined by measuring the volume (length: a, width: b and thickness: c) and the weight ($W_0$) of a dried specimen. Namely, measuring the weight ($W_1$) of a water-containing specimen obtained by dipping the dried specimen in water and replacing the air remaining in opening cells of the specimen by the water under a reduced pressure of 30 – 40 mmHg.; measuring the density (d) of the polymer components of the specimen; and then calculating according to the following equation.

$$\text{Opening rate (\%)} = \frac{W_1 - W_0}{a \cdot b \cdot c - W_0/d}$$

wherein the denominator represents a whole volume of spaces in a specimen and the numerator represents a whole volume of open spaces of cells.
[4] Air transmission represents the one measured at ordinary temperature under a filtration pressure of 70 mmHg.
[5] Tear strength represents a value measured by the method according to ASTM-D-1938.
[6] Tensile strength represents a value measured by the method according to ASTM-D-638.

As can be seen from the above Tables I and II, the product obtained from Formulation E containing no ethylene-vinyl acetate copolymer as a secondary polymer has no open cells and thus no fluid transmitting property. On the other hand, even products obtained from the Formulations J and K, both containing ethylene-vinyl acetate copolymer, have almost no fluid transmitting property since the ethylene-vinyl acetate copolymer does not meet such desired requirements that a melt index thereof should be 2.0 or more and a vinyl acetate content thereof should be 10% or more. These Formulations E, I, J and K are given as comparative examples. And, as can be seen from Formulation I, foaming of only the ethylene-vinyl acetate copolymer having a low melt index and a low vinyl acetate content gives almost no fluid transmitting property. By contrast, as is shown in Formulation H, an effectively high fluid transmitting property can be attained by incorporating, as a secondary polymer, the ethylene-vinyl acetate copolymer of the present invention. The products obtained from Formulations A through D and F through H have many open cells and high fluid transmitting property as well as such good filtering capacity which is capable of almost completely separating diatomaceous earth from water that, when an 10% aqueous suspension of the earth having an average particle size Example 2

With a low density polyethylene (melt index: 0.3, density: 0.917) was blended an ethylene-vinyl acetate copolymer (melt index: 6, vinyl acetate content: about 30%) at the proportion indicated in the following Table III.

Table III

| Polymer | Formulation | | | | |
|---|---|---|---|---|---|
| | A | B | C | D | E |
| ①Low density polyethylene (Substrate) | 50 | 70 | 80 | 90 | 95 |
| ⑩Ethylene-vinyl acetate copolymer (secondary polymer) | 50 | 30 | 20 | 10 | 5 |

[Note]
The proportion of the polymer is given by weight %.

Then, into 100 parts by weight of each of the above mixtures were uniformly blended 0.75 parts of azodicarbonamide as a decomposition type blowing agent, 0.5 parts of zinc stearate as an auxiliary blowing agent, 1.0 part of calcium stearate and 0.5 parts of talc as an nucleating agent. Each mixture was extruded, with foaming, at a extrusion temperature of 130° – 200°C. and an extrusion speed of 300 cm./min. by means of a 45 mm.-diametered extruder provided with an annular die having a diameter of 75 mm. and a slit of 0.6 mm. The extrudate was inflated to produce a tubular porous material having a thickness of about 0.45 mm. and a lay flat width of 350 mm. The properties of the resulting porous material are shown in the following Table IV. In this case, the details of extrusion condition are as follows:

$Q/W = 300$ (cm./min.)
$S/t_2 = 1.73 - 1.78$
$a = 2.2 - 2.4$ (times)

Table IV

| Formulation<br>Measured value | Properties | | | | |
|---|---|---|---|---|---|
| | A | B | C | D | E |
| Average cell size (mm.) | 0.05 | 0.05 | 0.07 | 0.10 | 0.13 |
| Density (g./cm$^3$) | 0.42 | 0.43 | 0.39 | 0.43 | 0.41 |
| Opening rate (%) | 95 | 86 | 75 | 40 | 8 |
| Air transmission (liters/cm$^2$, min.) | 6.5 | 5.5 | 2.5 | 0.3 | 0.001 |
| Tear strength (kg./cm.) | 17 | 15 | 12 | 15 | 14 |
| Tensile strength (kg./cm$^2$) | 31 | 29 | 28 | 35 | 33 |

[Note]
The methods for measuring the values are the same as in Example 1.

There were formed porous materials which had smooth surface, high whiteness and uniform and fine-cell cellular structure and, as the amount of the ethylene-vinyl acetate copolymer incorporated was increased, the opening rate and air transmitting property were more increased accompanied by improved flexibility. The Formulation A gave a porous material which is pliant to the touch like a deer skin.

Though it was generally believed in the art that tear strength tends to be reduced as the opening rate increases, incorporation of ethylene-vinyl acetate copolymer tends to prevent such reduction of tear strength and rather result in substantial increase thereof.

On the other hand, the air transmitting porous material derived from Formulation B was heat-sealed by means of an impulse-type heat sealer into a bag-type tubular filter, which was then set at the outlet of an air blower. Diatomaceous earth having an average particle size of 20 μ was fed into the filter, whereby the earth was caught upon the filter. The collectivity was 98%, which shows effective collection of almost all particles.

Example 3

A foaming blend was prepared by employing Formulation F in Example 1. The blend was melted, kneaded in a 45 mm.-diametered extruder provided with a coat hanger type T-die having an effective lip width of 200 mm. and a slit clearance of 0.4 mm., and extruded from the die at an extrusion temperature of 130° - 200°C. and an extrusion speed of 522 cm./min. and then the completely foamed material was quenched to produce a smooth endless sheet having a thickness of 0.97 mm., a width of 180 mm. and a high whiteness and a uniform and fine foaming degree. The details of extrusion conditions were as follows:

$Q/W = 522$ (cm./min.)
$S/t_2 = 0.55$
$a = 2.3$ (times)

The porous material thus produced had an average cell size or diameter of 0.08 mm., a density of 0.42 g./cm$^3$, an opening rate of 75%, an air transmission of 2.8 liters/cm$^2$.min. and a somewhat rigid feeling of touch. The material was found to have a capacity to accomplish complete separation of diatomaceous earth from water when used to filter an aqueous suspension of diatomaceous earth having an average particle size of 10 μ.

Example 4

The same procedure as in Example 1 was repeated except that a blend of 70 parts by weight of a low density polyethylene having a melt index of 0.3 and a density of 0.917 with 30 parts by weight of ethylene-ethyl acrylate copolymer having a melt index of 4 and an ethyl acrylate content of 30% was employed, thereby producing a tubular porous material having a thickness of 0.37 mm. and a lay flat width of 340 mm. The material thus produced had a uniform foaming degree and good properties, i.e., an average cell size of 0.15 mm., a density of 0.36 g./cm$^3$, an opening rate of 70%, an air transmission of 1.7 liters/cm$^2$. min., a tear strength of 14 kg./cm. and a tensile strength of 30 kg./cm$^2$.

Example 5

The same procedure as in Example 4 was repeated except that an ethylene-methyl methacrylate copolymer having a melt index of 3 and a methyl methacrylate content of 23% was employed as the secondary polymer to produce a tubular porous material having a thickness of 0.4 mm. and a lay flat width of 350 mm. The material thus produced had a uniform foaming degree and good properties, i.e., an average cell size of 0.11 mm., a density of 0.36 g./cm$^3$, an opening rate of 64%, an air transmission of 0.8 liters/cm$^2$. min., a tear strength of 10 kg/cm. and a tensile strength of 25 kg./cm$^2$.

Example 6

A low density polyethylene having a melt index of 0.3 and a density of 0.917 and the unvulcanized rubber indicated in Table V were kneaded in a Bunbury mixer at the proportion indicated in Table V to make pellet-like materials. To the resulting blend were thoroughly admixed 0.8 parts of azodicarbonamide as a decomposition type blowing agent, 0.6 parts of zinc stearate as an auxiliary blowing agent, 1.1 parts of calcium stearate and 0.5 parts of finely divided talc as a nucleating agent, based upon 100 parts by weight of the blend.

The resulting dry blend was then melted in a 45 mm.-diametered extruder at cylinder temperatures of 170°C., 200°C., 180°C. and 150°C., respectively extruded at an extrusion speed of 400 cm./min. from an annular die having a diameter of 75 mm. and a slit clearance of 0.4 mm. and then a given amount of air was supplied into the extruded tube, which was then inflated to a given size and cooled between the die and the nip roll to produce a tubular film having a thickness of about 0.4 mm. and a lay flat width of about 350 mm. The properties of the porous material thus obtained are shown in the following Table VI. In this case, the details of extrusion conditions are as follows:

$Q/W = 400$ (cm./min.)
$S/t_2 = 1.22 - 1.36$
$a = 1.8 - 2.5$ (times)

Table V

| Kind of rubber Polymers | a | b | c | d | e | f | g | h |
|---|---|---|---|---|---|---|---|---|
| ① Low density polyethylene (% by weight) | 70 | 65 | 70 | 65 | 75 | 70 | 70 | 70 |

Table V-continued

| Kind of rubber Polymers | a | b | c | d | e | f | g | h |
|---|---|---|---|---|---|---|---|---|
| Rubber (% by weight) | 30 | 35 | 30 | 35 | 25 | 30 | 30 | 30 |

[Note]
a: Polybutadiene (a cis content of 36%, Mooney viscosity of 55, and a density of 0.89g./cm³) [Trade name: ASADEN 55AS, available from Asahi Kasei Kogyo K.K.]
b: Styrene-butadiene rubber (solution-polymerized, Mooney viscosity of 45 and a density of 0.91g./cm³) [Trade name: TAFUDEN 200A, available from Asahi Kasei Kogyo K.K.]
c: Styrene-butadiene rubber (emulsion-polymerized, a styrene content of 24%, Mooney viscosity of 50 and a density of 0.91g./cm³) [Trade name: AMERIPOLE 1500, available from Ameripole Co., Ltd.]
d: Styrene-butadiene rubber (emulsion-polymerized, a styrene content of 50%, Mooney viscosity of 70, and a density of 0.95g./cm³) [Trade name: HYCAR 2001, available from Nippon Zeon K.K.]
e: Polyisoprene (a cis content of 92%, Mooney viscosity of 55 – 60 and a density of 0.90g./cm³) [Trade name: CARIFLEX 307, available from Shell Co., Ltd.]
f: Polyisobutylene (Mooney viscosity of 71 – 80 and a density of 0.90g./cm³) [Trade name: ESSOBUTYL 218, available from Esso Co., Ltd.]
g: Ethylene-propylene methylene linkage (E.P.M.) (Mooney viscosity of 45 and a density of 0.85g./cm³) [Trade name: DUTRAL CO/054, available from Montecatini Co., Ltd.]
h: Ethylene-propylene diene methylene linkage (E.P.D.M.) (Mooney viscosity of 86 and a density of 0.85g./cm³) [Trade name: NODEL 1070, available from E.I. du Pont.]

Table VI

| kind of rubber Measured value | a | b | c | d | e | f | g | h |
|---|---|---|---|---|---|---|---|---|
| Average cell size (mm) | 0.13 | 0.15 | 0.12 | 0.10 | 0.20 | 0.25 | 0.4–0.6 (broad distribution) | 0.3–0.7 (broad distribution) |
| Density (g./cm³) | 0.50 | 0.46 | 0.49 | 0.45 | 0.39 | 0.36 | 0.40 | 0.37 |
| Opening rate (%) | 80 | 65 | 71 | 59 | 74 | 78 | 5 | 3 |
| Air transmission (liters/cm². min.) | 2.9 | 1.6 | 1.8 | 2.0 | 2.1 | 3.8 | 0 | 0 |
| Tear strength (kg./cm.) | 3.0 | 4.3 | 7.4 | 5.0 | 4.4 | 7.5 | 12 | 9 |
| Tensile strength (kg./cm²) | 20 | 18 | 25 | 26 | 15 | 16 | 26 | 21 |

[Note]
The methods for measuring the values are the same as in Example 1.

It can be seen that the foamed films derived from the above Formulations *a* through *f* are of uniform and fine-cell cellular structure as well as of excellent appearance. These are also pliant to the touch like a deer skin and have many open cells, no skinning on the surface and an effective air transmitting property. Among the rubbers, polybutadiene, polyisobutylene, polyisoprene, solution polymerization-type styrene-butadiene rubber were in particular excellent in filtering capacity for diatomaceous earth. The foamed films derived from the above Formulations *g* and *h* had a large cell size at the foaming, few open cells, a broad distribution of cell sizes and a poor air transmitting property, and thus they had different properties from those of the secondary polymer having a cell-opening activity of this invention.

Example 7

A low density polyethylene having a melt index of 0.3 and a density of 0.921 g./cm³ and polybutadiene rubber (the *a* of Example 6) were thoroughly kneaded in Bumbury mixer in the proportion indicated in the following Table VII to form a pellet-like (blend). The blend thus obtained was dry-blended and extruded in the same manner as in Example 6 to produce a tubular film having a thickness of about 0.45 mm. and a lay flat width of about 300 mm. In this case, the details of extrusion conditions were as follows:

$Q/W = 300$ (cm./min.)
$S/t_2 = 1.10 - 1.15$
$a = 2.0 - 2.3$ (times)

Table VII

| Formulation Polymers | A | B | C | D |
|---|---|---|---|---|
| ① Low density polyethylene (% by weight) | 90 | 80 | 70 | 50 |
| ⓐ Polybutadiene rubber (% by weight) | 10 | 20 | 30 | 50 |

The properties of the resulting film are shown in the following Table VIII.

Table VIII

| Formulation Measured values | A | B | C | D |
|---|---|---|---|---|
| Density (g./cm³) | 0.40 | 0.42 | 0.44 | 0.46 |
| Opening rate (%) | 35 | 54 | 66 | 73 |
| Air transmission (liters/cm². min.) | 0.17 | 0.51 | 2.10 | 3.10 |

[Note]
The methods for measuring the above values are the same as in Example 1.

The porous materials thus obtained at every formulation had uniform and fine-cell cellular structure and attractive appearance. As the amount of butadiene rubber blended is increased, the pliant touch is correspondingly increased and particularly the material obtained from the Formulationn D a feel like a high-grade leather.

EXAMPLE 8

A low density polyethylene having a melt index of 0.3 and a density of 0.917 g./cm³ and a thermoplastic elastomer pellet (a butadiene-styrene block copolymer having a styrene content of 40%, a weight average molecular weight of about 100,000 and a density of 0.94g.&cm³) were dry-blended at the proportions indicated in the following Table IX. To 100 parts by weight of the resulting blend were uniformly blended in a conventional blender 0.75 parts by weight of azodicarbonamide as a decomposition type blowing agent, 0.5 parts by weight of zinc stearate as an auxiliary blowing agent, 1.0 part of calcium stearate and 0.5 parts by weight of talc as a nucleating agent. The blend thus obtained was melted at cylinder temperatures of 160° – 200°C. in a 45 mm.-diametered extruder and continously extruded at an extrusion speed of 600cm./min. from an annular die having a slit clearance of 0.3 mm. and a diameter of 75 mm. The extruded tube was supplied with a given amount of air to inflate up to a given diameter and cooled between the die and the nip roll to given a tubular film having a thickness of about 0.55 mm. and a lay flat width of about 350 mm. In this case, the details of extrusion conditions were as follows:

$Q/W = 600$ (cm/min.)
$S/t_3 = 0.73 - 0.75$
$a = 2.4 - 2.6$ (times)

The measured values of the resulting porous materials are shown in the following Table X.

Table IX

| Polymers | Formulation | | | |
|---|---|---|---|---|
| | A | B | C | D |
| ① Low density polyethylene (% by weight) | 90 | 80 | 70 | 50 |
| Thermoplastic elastomer (% by weight) | 10 | 20 | 30 | 50 |

Table X

| Measured value | Properties Formulation | | | |
|---|---|---|---|---|
| | A | B | C | D |
| Average cell size (mm.) | 0.10 | 0.10 | 0.05 | 0.04 |
| Density (g./cm³) | 0.36 | 0.36 | 0.37 | 0.39 |
| Opening rate (%) | 38 | 60 | 75 | 84 |
| Air transmission (liters/cm² min.) | 0.15 | 2.8 | 5.1 | 6.2 |
| Tear strength (kg./cm.) | 17 | 16 | 22 | 28 |
| Tensile strength (kg./cm²) | 40 | 32 | 35 | 41 |

[Note]
The methods for measuring the values are the same as in Example 1.

The porous materials which are produced had a uniform and fine-cell cellular structure and openings and were excellent both in appearance and touch. Especially the products obtained from the Formulations C and D were pliant to the touch like a deer skin and had such good filtering capacity which is capable of almost completely separating diatomaceous earth from water so that, when a 10% aqueous suspension of the earth having an average particle size of 20 $\mu$ is filtered through them under a filter pressure of 70 mmHg., no turbidity is observed in the filtrate.

As can be seen from the above Table X, when the amount of the thermoplastic elastomer is increased, the opening rate and air transmission are increased, and though tear strength generally tends to be reduced as the opening rate increases, incorporation of the thermoplastic elastomer as the secondary polymer acts to greatly increase the tear strength.

The porous material obtained from Formulation C and having a thickness of 0.55 mm. and a cotton cloth preliminarily coated with rubber type adhesives on one face thereof employing a transfer coating apparatus with a doctor knife were pressed and bonded together through a pinch roll, then dried to form a double layer sheet of 0.8 mm thick. The formed double layer sheet was excellent in air transmitting property and showed an air transmission of 4.0 liters/cm².min under a pressure of 70 mmHg., and it had also a water repelling property on the surface, a soft and warm touch like a high-quality deer skin. The double layer sheet was tested in a Taber abrasion tester to show that the wear was 45 mg. when worn 1000 times. By way of comparison, one of polyurethane air transmitting leathers on the market when tested showed an air transmission of 0.25 liters/cm².min. and a wear of 87 mg. These properties were inferior to those of the present air transmitting leather.

To a solvent of 60 parts by weight of methanol mixed with 40 parts by weight of calcium chloride, 20 parts by weight of Nylon resin were added and then heated to 80° – 90°C. with stirring and dissolved to obtain a viscous solution. The double layer sheet obtained from the above process was uniformly coated on the surface with the viscous solution thus prepared in a thickness of about 0.2 mm. by a coater with a doctor blade, then cooled to be set in water, washed and dried to obtain a leather of about 0.92 mm. thick having an excellent touch as good as a natural leather. The product obtained has an excellent air transmission of 1.1 liters/cm².min. and a Taber wear of 47 mg..

EXAMPLE 9

To 60 parts by weight of a high density polyethylene (melt index : 3.0, density : 0.97 g/cm³) were added 40 parts by weight of a thermoplastic elastomer (the same material as in Example 6), 0.65 parts by weight of azodicarbonamide as a decomposition type blowing agent, 0.40 parts by weight of zinc stearate, 1.0 part by weight of calcium stearate and 0.5 parts by weight of talc. The resulting mixture was well blended by means of a blender, and then treated, employing a T-die, in the same manner as in Example 3 to obtain a foamed endless sheet having a thickness of 1.10 mm. and a width of 170 mm. The thus obtained sheet had a uniform and open, fine-cell cellular structure, a density of 0.44 g./cm³, an average cell diameter of 0.07 mm., a smooth appearance and a hard touch. The sheet was tough and was not broken even by 1000 times repeated bendings. The characteristic properties of the sheet were as follows: an air transmission of 5.3 liters/cm².min., an opening rate of 86%, a tear strength of 52 kg/cm and a tensile strength of 63 kg/cm².

For comparative purposes, the blend obtained above was extruded with foaming, employing the same apparatus as above, at a T-die slit clearance of 0.18 mm. and an extrusion speed of 300 cm/min. to obtain a sheet-shaped plastic foam having an expansion of 2.1 (times) and a thickness of 2.3 mm.. The thus obtained sheet had many wrinkles and extraordinary irregularity on its surface, an uneven foaming and voids therein, and thus was different in properties from a porous material according to the present invention. The details of extrusion condition were summarized as follows:

$Q/W = 300$ (cm./min.)
$S/t_2 = 0.10$
$a = 2.1$ (times)

Comparative Example 1

The blend obtained from the Formulation C in Example 6 was extruded with foaming in same manner as in Example 6 except that azodicarbonamide was employed in an amount of 5 parts by weight. The extrusion was rather unstable during the process and gas was gushed out of the blend to form holes locally on the surface of the tubular film obtained. The surface was so rough that the material could not be regarded as having a uniform foaming. The tear strength and opening rate thereof were as low as 2 – 3 kg/cm and 20 – 30%, respectively.

Comparative Example 2

To 85 parts by weight of low density polyethylene (melt index : 0.3, density : 0.917 g./cm$^3$) were added 15 parts by weight of polystyrene (weight average molecular weight : about 250,000) and the blend thus obtained was extruded with foaming in the same manner as in Example 1. The material obtained had a smooth surface and a high whiteness, a uniform foaming, a thickness of 0.37 mm. and a density of 0.54 g./cm$^3$. The material had also an opening rate of 43%, an air transmission of 0.9 liters/cm$^2$.min., a tear strength of 3 kg/cm and a tensile strength of 13 kg/cm$^2$. Thus the material was inferior in properties when compared to a porous material obtained according to the present invention in both the fluid transmitting property and strength.

Comparative Example 3

The blend obtained from Formulation C in Example 2 was extruded with foaming employing a 45 mm.-diametered extruder provided with an annular die having a diameter of 150 mm. and a slit clearance of 2 mm. at the same extrusion temperature and at an extrusion speed of 6.5 cm/min. to obtain a sheet-shaped plastic foam having an expansion of 2.5 (times) and a thickness of about 0.75 mm. The details of extrusion condition were as follows:
$Q/W = 6.5$ (cm/min.)
$S/t_2 = 3.6$
$a = 2.5$ (times)

The thus obtained sheet had an extraordinary irregularity on its surface, pin holes, large voids and an uneven foaming and thus was inferior to a product obtained according to the present invention.

The same blend was extruded with foaming employing the same apparatus as above, at an extrusion speed of 300 cm/min. to obtain a sheet-shaped plastic foam having an expansion of 2.5 (times) and a thickness of 0.2 mm. The material thus obtained had many pin holes, many voids formed of cells which collapsed and extraordinary irregularity on the surface, and thus was different in properties from a porous material obtained according to the present invention. The details of extrusion conditions were as follows:
$Q/W = 300$ (cm/min.)
$S/t_2 = 13.6$
$a = 2.5$ (times)

What is claimed is:

1. A method of making a tube or sheet-shaped fluid transmitting porous material having an extension of 1.2 to 10 times and a thickness of 0.15 to 3 mm. which comprises mixing a polyolefin (A) and a secondary polymer (B) and a decomposition type chemical blowing agent, said secondary polymer (B) being a member selected from the group consisting of:
   1. an ethylene-vinyl ester copolymer of which the vinyl ester content is at least 10% or more by weight based on the copolymer,
   2. a copolymer of ethylene with an unsaturated carboxylic acid ester of which the unsaturated carboxylic acid ester content is at least 10% or more by weight based on the copolymer,
   3. a rubber selected from the group consisting of a natural rubber, a butadiene rubber, a solution-polymerized random copolymer type styrene-butadiene rubber, an emulsion-polymerized random copolymer type styrene-butadiene rubber, a butadiene-acrylonitrile rubber, an iosprene-butadiene rubber, a polyisoprene rubber and an isobutylene-isoprene rubber,
   4. A thermoplastic elastomer selected from the group consisting of a styrene-butadiene block copolymer and a styrene-isoprene block copolymer, and mixtures thereof, said secondary polymer being employed in an amount of $$5 \leq \frac{B \times 100}{A + B} \leq 95\% \text{ by weight;}$$

and continuously subjecting the resulting polymer mixture to extrusion while foaming, to form a film by passage through a die of an extruder; said extrusion moulding being effected under conditions defined by the formula:
$0.15 < S/t_2 \; 10$
wherein
$t_2 = t_1/a^{1/3}$
$1.2 < a < 10$,
$S$ represents an average die slit clearance (mm.),
$t_2$ represents an average thickness of the foaming polymer composition in the state before foaming (mm.),
$t_1$ represents an average thickness of the porous material (mm.), and
$a$ represents an expansion based on the volume of the foaming polymer composition in the state before foaming (times.)

Said extrusion further satisfies the following conditions:
$7 \leq V = Q/W$
wherein
$Q$ represents an extrusion volume of the extruded porous material from which the contained space volume is subtracted (cm$^3$/min.),
$W$ represents a cross section area of the die slit (cm$^2$), and
$V$ represents an extrusion speed calculated from $Q$ and $W$ (cm./min.).

2. A method as claimed in claim 1 wherein the extrusion is effected under the following conditions:

$$0.3 \leq \frac{S}{t_1/a^{1/3}} < 5.$$

3. A method as claimed in claim 1, wherein said polyolefin is a member selected from the group consisting of a low density polyethylene, a high density polyethylene, a polypropylene, a polybutene, a polypentene, a propylene-ethylene copolymer, a propylene-hexene copolymer, an ethylene-vinyl acetate copolymer wherein the vinyl acetate content is less than 10% by weight based on the copolymer, an ethylene-ethyl acrylate copolymer wherein the ethyl acrylate content is less than 10% by weight based on the copolymer, an ethylene-methyl methacrylate wherein the methyl methacrylate content is less than 10% by weight based on the copolymer, and mixtures thereof.

4. A method as claimed in claim 1, wherein said ethylene-vinyl ester copolymer and said copolymer of ethylene with an unsaturated carboxylic acid ester are an ethylene-vinyl acetate copolymer wherein the melt index is at least 2.0 and the vinyl acetate content is at least 10% by weight based on the copolymer and a member selected from the group consisting of an ethylene-ethyl acrylate copolymer wherein the ethyl acrylate content is at least 10% by weight based on the copolymer and an ethylene-methyl methacrylate copolymer wherein the methyl methacrylate content is at least 10% based on the copolymer.

5. A method as claimed in claim 1, wherein said thermoplastic elastomer is a member selected from the group consisting of a styrene-butadiene block copolymer and a styrene-isoprene block copolymer.

6. A method as claimed in claim 1, wherein said decomposition type blowing agent is a member selected from the group consisting of azodicarbonamide, barium azodicarboxylate, diazoaminobenzene, 4,4'-hydroxy-bisbenzene sulfonylhydrazide and dinitrosopentamethylenetetramine.

7. A method as claimed in claim 1 wherein said secondary polymer is employed in an amount of $$10 \leq \frac{B \times 100}{A + B} \leq 50\% \text{ by weight.}$$

8. A method as claimed in claim 1, wherein said decomposition type blowing agent is employed in an amount of 0.1 – 5 parts by weight, in terms of parts of azodicarbonamide, per 100 parts by weight of a mixture of the polyolefin and the secondary polymer.

* * * * *